May 20, 1947.  S. V. PETERSON ET AL  2,420,722
APPARATUS FOR COATING SURFACES
Filed Dec. 11, 1942

STANLEY V. PETERSON
ARTHUR F. TURNER
INVENTORS

ATTORNEYS

Patented May 20, 1947

2,420,722

UNITED STATES PATENT OFFICE 2,420,722

APPARATUS FOR COATING SURFACES

Stanley V. Peterson, Rochester, and Arthur F. Turner, Brighton, N. Y., assignors to Bausch & Lomb Optical Company, Rochester, N. Y., a corporation of New York Application December 11, 1942, Serial No. 468,734

3 Claims. (Cl. 91—12.2)

This invention relates to an apparatus for treating optical surfaces and producing films thereon to reduce the reflection of light from such surfaces.

It has long been known that when light passes from air to a transparent material or conversely, a fraction of the light is reflected from the surfaces of the material. This reflected light, generally comprising 4% more or less of the incident light at each surface, creates in many instances disturbing images in an optical system and will reduce image brightness.

Attempts have been heretofore made to eliminate or at least reduce the amount of light reflected by coating the surface or surfaces of the system with a so-called transmission film and although such films will greatly reduce the amount of light reflected, it has been found that they cannot be used under all conditions of use.

The films have been applied by numerous methods but the most generally used method is by evaporating the film-forming material onto the surface while the material and surface are maintained in a vacuum. The cohesion between films so formed and the surface and the hardness and durability of the film itself is such that care must be taken in handling the elements and they cannot be used where the coated surfaces are subject to any wear or rubbing action. They are particularly inefficient and give a short period of serviceability where used under humid or damp conditions such as are found at sea.

Several unsuccessful attempts have been made to increase the tenacity and durability of transmission films. Some success with evaporated metallic reflection films has been obtained by treating or conditioning the surface to be coated prior to the evaporation of the film by subjecting the surface to a high tension direct current electrical discharge.

There is considerable conjecture as to the nature of the change in the surface subject to the discharge and for this reason, no discussion will be made here of the theoretical considerations involved.

Attempts to so condition the surfaces to be coated with transmission films have ended in failure, which we believe is due to the fact that the electrodes for the conditioning discharge have generally been formed of aluminum. This metal was used as it was believed that aluminum did not disintegrate by reason of the discharge. We have found, however, that although aluminum is generally considered as a metal which cannot be sputtered, yet some portion of the metal is torn off by the current and a film, presumably of aluminum, is deposited on the surface during the conditioning process. This film soon becomes heavy enough to scatter light to an appreciable extent and so destroys the efficiency of the later deposited transmission film.

This difficulty is obviated by the present invention for the electrodes of the invention herein disclosed will not form a film on the surface treated even though a high voltage discharge is maintained between the electrodes for a relatively long period of time. The electrode disposed adjacent the surface to be treated may be formed of chromium, silicon or magnesium. In the now-preferred embodiment of the invention, the electrode is formed of magnesium or an alloy rich in magnesium. Although a number of magnesium-rich alloys can be used, the alloy sold under the trade-name "Dowmetal F" has given excellent results. The alloy known as "Dowmetal F" consists of 95.7% magnesium, 4.0% aluminum, and 0.3% manganese.

The electrode should be formed with a surface corresponding in shape to, and at least coextensive with, the surface to be treated. It has been found that the electrode should be disposed in close proximity to the surface during the discharge to insure the maximum conditioning effect.

In the now-preferred embodiment of the invention, the surface to be treated is mounted in an evacuable container closely adjacent to the electrode and the pressure within the container reduced to at least 400 and not less than 15 microns. A high voltage current is then sent between the electrodes, one of which is arranged on the side of the body opposite to the surface to be treated. This discharge is continued for approximately one hour and thereupon the current is broken.

If it is desired to simultaneously condition opposite surfaces, the two electrodes can be suitably arranged with relation to the surfaces to be treated, and a high voltage alternating current sent between the two electrodes. It is to be understood that the two electrodes in this use of the invention should be formed of magnesium or a metal rich in magnesium and disposed in close proximity to the surfaces to be treated.

If desired, the coating material can be evaporated within the same container by further evacuating the same and then evaporating the material or the conditioned surfaces can be removed from the container and the material evaporated under a greater vacuum in a different container.

Other objects and advantages will appear from the following description taken in connection with the accompanying drawing in which.

Figures 1, 2:
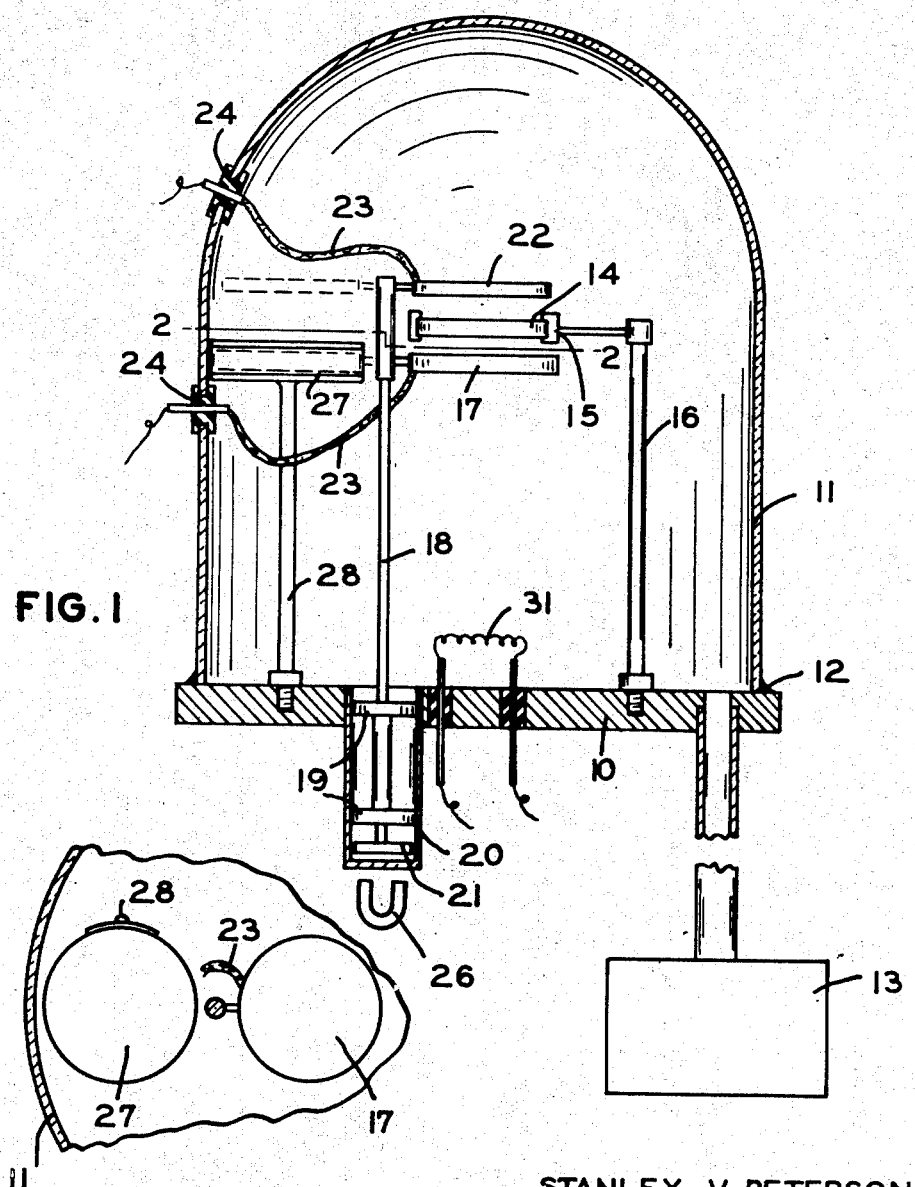
Fig. 1 is a sectional view partly in elevation of the apparatus of the present invention.
Fig. 2 is a section taken along line 2—2 of Fig. 1.

The apparatus of the present invention, referring now to the drawing, is supported by a suitable base plate 10 which carries the evacuable container shown here as a bell jar 11 of glass or other material. A vacuum-tight seal is formed between the lower edge of the bell jar 11 and the base plate 10 by any suitable sealing means 12 such as wax or the like. The bell jar can be connected by any suitable means to a conventional high vacuum pump shown here diagrammatically at 13.

The body 14 having the surface to be coated is mounted in a suitable support 15 carried by a stanchion 16, secured at the lower end thereof in the support base plate 10. The body 14 is held in close proximity to the electrode 17 carried by a support 18, rotatably mounted by means of suitable bearings 19 in a well 20 formed of some suitable non-metallic or non-magnetic metal. The support 18 carries at its lowermost end an iron core 21, the purpose of which will be hereinafter more fully described.

A second electrode 22 is also fixed to the support 18 and both electrodes are connected to wires 23 passing through sealed grommets 24 carried by the wall of the bell jar, and connected to a suitable source of high voltage current.

In carrying out the method of the present invention, the body 14 is fixed in a support 15 and the electrode 17 adjusted until the one surface thereof is closely adjacent to the surface of the body 14 which is to be coated. The electrodes are then energized and the body immersed in a glow discharge after the pressure within the container has been reduced to at least 400 and not less than 15 microns. Although good results can be obtained at the pressure range indicated, we have found that the optimum pressure range is 200 to 100 microns depending on the body having the surface to be coated. The heat generated by the discharge is proportional to the pressure and where cemented elements are being coated, the pressure must be held at pressures of 200 microns or greater.

In such conditioning processes as have heretofore been used, the electrodes for the conditioning discharge have been generally formed of aluminum as aluminum is considered to be a metal which will not disintegrate or sputter by reason of the discharge. It has been found, however, that although aluminum sputters slowly, nevertheless, if the discharge is continued for a considerable length of time, some of the metal is torn off by the current and is deposited on the surface of the body to be coated. This deposition of the metal forms a film on the surface of the body which scatters light and at least partially destroys the effect of the later deposited transmission film.

Although there are other metals which may be used to form the electrodes and which cannot be sputtered, such as chromium and silicon, the applicants have found that the difficulty heretofore encountered by the use of aluminum can be obviated by forming the electrodes, or at least the electrode adjacent to the surface to be coated, of magnesium or an alloy rich in magnesium. A large number of magnesium-rich alloys are produced commercially in this country and although a number of such magnesium alloys can be used, it has been found that an efficient electrode is one formed of the alloy sold under the trade-name "Dowmetal F."

The electrode adjacent to the surface to be coated should be formed with a surface corresponding to and of an area at least as great as the area of the surface to be treated. Accordingly, if the surface to be coated comprises that of a concave lens, the electrode should be formed as a concave-convex plate with the convex side adjacent the concave surface of the lens.

Physicists and other authorities are in doubt as to the nature of the phenomena of forming films by evaporating material in evacuated containers and it is therefore difficult to determine the change brought about in the surface by reason of the discharge. Applicants will therefore not go into the theoretical consideration involved in their discovery as the theories underlying the conditioning phenomena of their discovery would necessarily contain a great amount of conjecture.

We have discovered, however, that the electrode should be placed closely adjacent to the surface to be treated, preferably about one inch, and that the conditioning effect appears to be less if the electrode is held further away from the surface being treated.

It has been found that excellent results can be obtained if the discharge is continued for approximately one hour where the current is preferably within the range of 35 to 40 milliamperes at 10,000 to 15,000 volts and the air pressure held within the range 100 to 200 microns. The efficiency of the conditioning process appeared to be substantially as high in operations however where the surfaces were subject to the discharge a greater or lesser time under different voltage and pressure conditions.

After the conditioning operation and interruption of the current, the vacuum within the bell jar can be broken and the work immediately transferred to one of the usual vacuum installations used in evaporating films where the usual evaporating routine can be carried out. Although the work need not be immediately transferred to the evaporating container, we have found that delays exceeding an hour destroy the efficacy of the conditioning operation so that the transfer should be made within an hour.

In the apparatus of the present invention, however, the film may be formed in the same container in which the conditioning process was carried out. In the use of this apparatus, the electrode 17 through a magnet shown at 26 can be rotatably moved from the position shown in Fig. 1 to an out-of-the-way position. The magnetic attraction between the magnet 26 and the iron core 21 should be sufficient to turn the core and the support 18 when the magnet is rotated while being held closely adjacent the underneath side of the well 20.

With the electrode 17 now swung back out of its position relative to the body 14 which it occupied during the conditioning process, the container can be pumped down further and the material to be evaporated placed in close proximity to a heating coil 31 which when energized will cause the coating material to be evaporated. The vapor produced by the heat of the coil condenses substantially uniformly over the surface of the body whereupon the electrode circuit is broken and the vacuum chamber opened and the body removed.

If desired, the electrode 17 may be rotatably moved into a casing 27 which houses the electrode 17 during the evaporating process. The casing 17 is supported above the base plate 10 by a post 28 having a foot portion secured to the base plate and prevents condensation on the electrode of vapor from the film-forming material during the evaporating step. Although no such casing has been shown for receiving the electrode 22, it is to be understood that such a casing may be provided, if desired.

It has been noticed that in the use of some materials, such as cryolite, a slightly improved film results if the conditioning electrode is coated with this material prior to the conditioning operation.

In certain types of optical bodies such as lenses, it is desirable to simultaneously condition opposite surfaces of such bodies. In this use of the invention, the two electrodes formed of magnesium or a magnesium-rich alloy, can be suitably arranged with respect to the surfaces to be treated and a high-voltage alternating current sent between the two electrodes. In this particular use of the present invention, the current pressure and the time of conditioning remains identical with that heretofore described.

The materials used for forming transmission film are now well-known in the art and any type of material desired may be used, such as cryolite or magnesium fluoride, although the material used may depend to some extent on the type of film desired.

Films formed by the apparatus and method of the present invention are not only more efficient, as no light-scattering film is deposited during the conditioning operation, but are also harder and consequently more durable than transmission films heretofore applied by equipment similar to that disclosed herein.

Films deposited in accordance with the present invention have withstood test atmospheres of substantially 100% relative humidity for periods of time not possible with films evaporated by any apparatus or method now known to us. As the films are more resistant to moisture, they can be applied to optical elements of instruments used under humid conditions such as found aboard ship at sea.

Furthermore, the cohesion between films and the surfaces coated thereby is very materially greater than the cohesion between films heretofore applied and the surfaces to which they have been applied.

Accordingly, the durability of the films and the increased cohesion between the same and the surfaces coated not only increases the serviceable life of such films but also increases the field of use of optical elements having surfaces coated with transmission films.

We have found that exceptionally uniform results can be obtained with the apparatus and method herein disclosed as long as the operating conditions are maintained uniformly. This is highly important, particularly in instruments where two fields are compared or brought into coincidence, for it is imperative that the same amount of light be transmitted by the two optical systems of the instrument to insure accurate results.

While certain preferred embodiments of the invention have been illustrated and described herein, it is to be understood that the invention is not limited thereby but is susceptible of changes in form and detail within the scope of the appended claims.

We claim:

1. In an apparatus for coating a surface of a body, an evacuable container; means for partially evacuating the same; means for supporting the body with at least the surface to be treated exposed; a pair of electrodes of which at least the electrode adjacent the exposed surface is formed of a metal rich in magnesium; means for holding such electrode in close proximity to said exposed surface; means for rotatably mounting said electrode holding means within said container; current supply means for energizing said electrodes whereby the exposed surface is subject to the direct action of the discharge between said electrodes; a heating coil for evaporating a coating material; and means for rotatably moving said electrode holding means to expose the surface of the body to be treated to the vapors of said coating material.

2. An apparatus of the type described comprising means providing an evacuated chamber, means for holding within the chamber a body having a surface to receive an evaporated material deposit, means facing said surface for vaporizing a source of material to be deposited, a pair of electrodes positioned, respectively, on opposite sides of the body, at least one of said electrodes being formed of a material which will not disintegrate when the electrodes are energized and having an area at least as great as said surface, said last named electrode being movably mounted near said body, means for selectively moving said last named electrode into an operative position so that it is close to and at least coextensive in area with said surface, and means for energizing the electrodes.

3. An apparatus of the type described comprising means providing an evacuated chamber, means for holding within the chamber a body having a surface to receive an evaporated coating of material, means in the chamber for vaporizing the material so that it will be condensed on said surface, a pair of electrodes in the chamber, at least one of the electrodes being formed of a material which contains at least 75% of magnesium, said last named electrode having a face which is at least as great in area as said surface, means for electrically energizing said electrodes, means for selectively moving said last named electrode to bring the face thereof opposite and in close relation to said surface of the body whereby said electrode may be moved into position for subjecting said surface to an electrical discharge and then removed from said position to permit deposition of the material on said surface.

STANLEY V. PETERSON.
ARTHUR F. TURNER.

REFERENCES CITED

The following references are of record in the file of this patent:

UNITED STATES PATENTS

| Number | Name | Date |
| --- | --- | --- |
| 2,079,784 | Williams | May 11, 1937 |
| 1,971,277 | Rupp | Aug. 21, 1934 |
| 2,207,656 | Cartwright | July 9, 1940 |
| 1,584,728 | Case | May 18, 1926 |
| 848,600 | Pirani | Mar. 26, 1907 |
| 2,100,045 | Alexander | Nov. 23, 1937 |
| 1,343,842 | Piersol | June 15, 1920 |
| 2,067,907 | Edwards | Jan. 19, 1937 |
| 767,216 | Edison | Aug. 9, 1904 |
| 2,160,981 | O'Brien | June 6, 1939 |
| 2,322,613 | Alexanders | June 22, 1943 |